Dec. 22, 1942.  M. A. EDWARDS ET AL  2,306,157
CONTROL SYSTEM
Filed Oct. 28, 1939

Inventors:
Martin A. Edwards,
Francis Mohler,
by Harry E. Dunham
  Their Attorney.

Patented Dec. 22, 1942

2,306,157

UNITED STATES PATENT OFFICE 2,306,157

CONTROL SYSTEM

Martin A. Edwards and Francis Mohler, Schenectady, N. Y., assignors to General Electric Company, a corporation of New York Application October 28, 1939, Serial No. 301,860

11 Claims. (Cl. 172—239)

This invention relates to control systems, more particularly to systems for controlling the operation of apparatus which has an element that operates on a length of material, and it has for an object the provision of a simple, reliable, and improved system of this character.

Examples of such apparatus are a cold strip steel rolling mill and a wire drawing machine in which a reel is provided for winding the finished product in a coil. The quality of the product is greatly improved by maintaining the tension of the material substantially constant during the winding operation. Various types of regulating devices and control systems have been used for maintaining constant tension in the material. These have been more or less successful, but all of them have left something to be desired. Most of the systems and devices heretofore used have employed vibratory contacts. Such devices are of delicate construction and involve high initial and maintenance costs. Accordingly, a further and more specific object of the invention is the provision of a control system of great ruggedness and which is considerably less expensive than devices heretofore used, both from the point of view of initial cost and operating and maintenance costs.

In carrying the invention into effect in one form thereof, a main dynamoelectric machine is mechanically connected to the element which operates on the length of material. In order to maintain the tension of the material substantially constant while the operation thereon is proceeding, an armature reaction excited dynamoelectric machine whose excitation is controlled in response to the tension of the material is provided for controlling the main dynamoelectric machine so as to maintain the tension of the material substantially constant.

In illustrating the invention in one form thereof, it is shown as embodied in a control system for the reel of a cold strip steel rolling mill.

Figure 1:
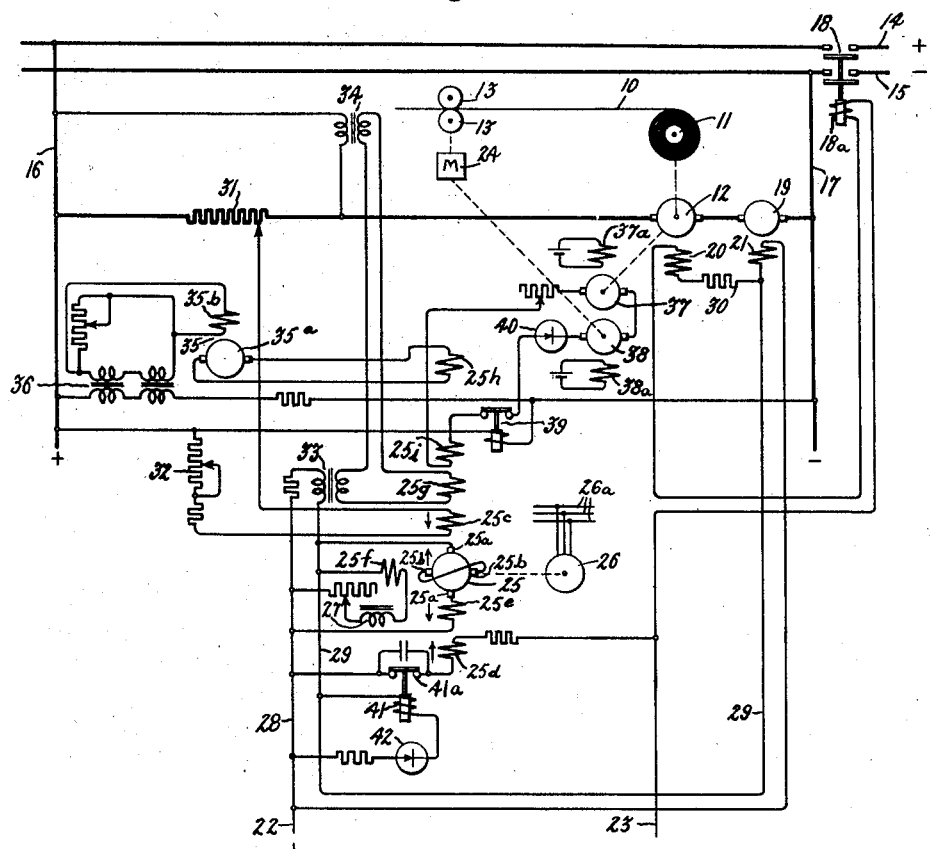
Figure 2:
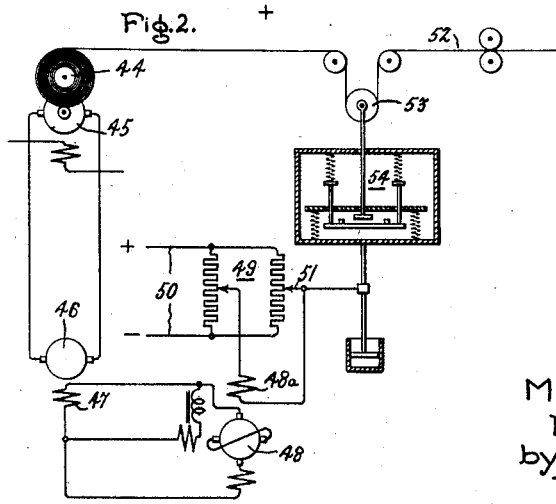

For a better and more complete understanding of the invention, reference should now be had to the following specification and to the accompanying drawing of which Fig. 1 is a simple, diagrammatical illustration of an embodiment of the invention and Fig. 2 is a simple, diagrammatical illustration of a modification.

Referring now to the drawing, a length of material 10 is attached to a reel 11 which in turn is mechanically connected to main dynamoelectric machine 12. The reel 11 may operate either as a take-up reel to wind the material as it is delivered from another part of the machine, or it may operate as a supply reel with the material being unwound therefrom and supplied to some other part of the machine. In the drawing the material 10 is illustrated as a length of cold strip steel passing through the mill rolls 13 to the reel 11 and being wound thereon. Accordingly, the main dynamoelectric machine 12 operates as a motor to drive the reel, whereas, if the reel 11 were operating as an unwinding reel, the main dynamoelectric machine 12 would operate as a generator driven by the reel.

The dynamoelectric machine, operating as a motor, is supplied from any suitable source such as represented by the supply lines 14, 15 to which it is connected by means of conductors 16 and 17 through a field protective switch 18. Source 14, 15 may be and preferably is a variable voltage source.

A booster generator 19 is connected in series relationship with the armature of main dynamoelectric machine 12 between an armature terminal and one side of the source. Main dynamoelectric machine 12 and booster generator 19 are provided with field windings 20 and 21 respectively which are supplied from a suitable source of excitation which is diagrammatically represented by the two supply lines 22, 23. The two field windings 20 and 21 are connected across the excitation source 22, 23 in series relationship with each other and with the coil 18a of the field protective switch.

The mill rolls 13 are driven at a speed, which is preferably substantially constant, by suitable driving means illustrated as an electric motor 24 which may be supplied from any suitable source, such as the source 14, 15. Since the motor 24 operates at constant speed for any given armature voltage, the strip of material 10 is delivered to the reel 11 at constant lineal speed, and as a result the speed of the motor 12 must decrease as the diameter of the coil increases. Since the strip is delivered to the reel at constant lineal speed, constant tension in the strip implies operation of the reel motor 11 at constant horsepower. Assuming the voltage of source 14, 15 to be reasonably constant, constant horsepower operation of motor 12 requires that the armature current of the motor be maintained constant as the speed varies over a wide range in accordance with the build-up of the coil on the reel.

In order to maintain the armature current constant with constant voltage applied to the armature and at the same time to change the speed of the motor in accordance with the build-up of the coil, it is necessary to vary the field excitation of motor 12. For the purpose of controlling motor 12 to maintain constant armature current, a special armature reaction excited dynamoelectric machine 25 is provided which is controlled in response to the armature current of the reel motor 12. Dynamoelectric machine 25 is driven by any suitable driving means such as an induction motor 26 which in turn is supplied from a suitable source represented by the three supply lines 26a.

Dynamoelectric machine 25 has two sets of brushes per pair of poles. Since machine 25, as illustrated, has but two sets of brushes, the machine 25 is therefore a two pole machine. One set of brushes 25a is connected to an external load which in this case comprises the field winding 20 of reel motor 12 and field winding 21 of booster generator 19, and the other set of brushes 25b is short circuited. The two mutually perpendicular brush axes of these two sets of brushes are known as the control axis and the short circuit axis respectively. The net flux along the control axis is produced by two opposing control field windings 25c and 25d, a series compensating field winding 25e and the armature reaction of the load current. These fluxes act in the directions indicated by arrows in Fig. 1. The flux along the short circuit axis is produced by the shunt field winding 25f and the armature reaction of the short circuit current. This short circuit axis flux generates the voltage which appears across the load brushes 25a, and the control axis flux produces the voltage which appears across the short circuited brushes 25b and causes short circuit current to flow.

The operation of dynamoelectric machine 25 will best be understood by considering the operation without the second control field 25d, the shunt and compensating fields 25f and 25e and then subsequently considering the effects of these fields on the operation.

Voltage is applied to the control field winding 25c and current begins to build up in it. Immediately there is generated a voltage in the short circuit path which circulates a large current in the short circuit. The armature reaction flux produced by this current generates a voltage across the load brushes 25a and causes load current to flow. But, the armature reaction of the load current opposes the control field and the system comes quickly to equilibrium with just enough resultant flux along the control axis to keep current flowing through the low resistance short circuit path. Any subsequent change in the load current will cause relatively large changes in the short circuit current and will be resisted by the machine up to its saturation point. Therefore the load current is almost independent of load voltage and can be increased or decreased only by changing the ampere turns of the control field.

During transient conditions, the increasing armature current induces a voltage in the control field windings which decreases their apparent inductances and causes the field current to build up rapidly. However, since any difference between the armature ampere turns along the control field axis produces a large short circuit current, the armature current is forced to increase almost simultaneously with the field current. The result is unusually rapid response.

The function of the shunt field is to reduce the steady-state short circuit current. For any given voltage across the load brushes 25a there must be a corresponding flux on the short circuit axis. If any part of this flux is produced by a shunt field winding, the amount of flux which must be produced by the short circuit armature current will be correspondingly reduced. For example, if the shunt field is adjusted to give enough excitation to generate nine-tenths of the voltage across the load brushes 25a, the short circuit current for any given load voltage will be only one-tenth as great as it would be if there were no shunt field.

The series compensating field is used principally to reduce the control power. It is connected so that the series field ampere turns oppose the armature reaction ampere turns along the control axis and leaves only a small residual magnetism to be overcome by the control field. In this way, the power amplification is increased many times.

The flux linkages of the shunt field winding 25f of machine 25 must be changed in order to change the load voltage appearing across the brushes 25a. Accordingly this field slows down the response of the machine very considerably. Also the current in the short-circuited winding of the rotor will, during the transient, build up rapidly in an attempt to change the voltage appearing at the load brushes 25a. However, the flywheel effect imposed by the shunt field winding opposing this change causes a large value of current to be built up in the short-circuited rotor winding, and the duration of the transient may be several seconds. The net result is that the rate of response is slowed down greatly. Under such conditions the machine would generate abnormally high currents in the short-circuited rotor winding, and this would be highly undesirable.

In order to overcome this difficulty, a suitable energy storage device, illustrated as an inductance 27, is connected in series relationship with the shunt field winding 25f. This inductance should not be coupled with the rotor circuit, and for this reason it is illustrated external to the machine itself. It will be understood, however, that the inductance could be built into the machine if desired. The effect of the inductance 27 in circuit with field winding 25f is to reduce the coupling between the shunt field winding and the rotor winding.

The predominant characteristics of machine 25 are rapid response and low ratio of control watts to load watts, e. g., an amplification as high as 25000:1. Its behavior is based primarily on the fact that the short circuit path tends to maintain zero net ampere turns along the control axis at all times.

In the example shown in Fig. 1, the armature reaction excited machine is used as a buck-boost exciter to regulate the field excitation of reel motor 11. The circuit is traced from positive side 22 of excitation source, through conductor 28, series winding 25e and armature of machine 25, conductor 29, resistor 30, field winding 20 of reel motor 12. The field winding 21 of booster generator 19 is connected in parallel with the armature of machine 25, by means of conductors 29, 29a and 28.

As previously pointed out, the two control fields 25c and 25d oppose each other. The control field winding 25d is connected across the constant voltage source of excitation 22, 23, and tends to make machine 25 buck the voltage of source 22, 23, and control field 25c tends to make machine 25 boost the voltage of source 22, 23. The field winding 21 of booster generator 19 is so connected to the armature of machine 25 that when machine 25 is boosting the voltage of source 22, machine 19 acts to buck the voltage of source 14, 15 and when machine 25 bucks the voltage of source 22, 23, machine 19 boosts the voltage of source 14, 15.

Control field winding 25c is connected across resistor 31 which is in series with the armature of reel motor 12. A rheostat 32 is connected in circuit with control field 25c.

Machine 25 is also provided with an additional field 25g on the control field axis. The secondary windings of two transformers 33 and 34 are connected in series relationship with each other and with field 25g. The primary winding of transformer 33 is connected across the armature circuit of machine 25 which regulates the field excitation of reel motor 25 and thus transformer 33 introduces into the circuit of field winding 25g a component of flux proportional to the rate of change of reel motor field voltage. The primary winding of transformer 34 is connected across resistor 31 which is connected in series with the armature of reel motor 12. This transformer introduces a component of voltage proportional to rate of change of reel motor armature current. Control field winding 25g exerts a stabilizing or anti-hunting effect on the operation of machine 25.

Machine 25 is further provided with an additional field winding 25h on the control field axis which is supplied from the armature 35a of an amplifying generator 35. The field winding 35b of the amplifying generator is connected across the secondary winding of a transformer 36 whose primary winding is connected across the source of supply 14, 15 for the reel motor 12. Thus the transformer 36 introduces a component of excitation on the control axis of the armature excited machine 25 which is proportional to the rate of change of voltage of source 14, 15 and therefore proportional to the rate of acceleration or deceleration of reel motor 12 when such acceleration or deceleration is effected by means of varying the voltage of source 14, 15. Instead of being connected across source 14, 15, transformer 36 might also be connected directly across armature of reel motor 12, or across a pilot exciter driven by motor 24. Transformer 36 produces a component voltage only when the voltage applied to reel motor 12 is changing, i. e., when the speed of the motor is changing, and this component voltage is used to cause armature excited machine 25 to force the reel motor 12 during acceleration by weakening its field and to force it during deceleration by strengthening its field to overcome inertia effects and thereby to maintain the tension of the material substantially constant during acceleration and deceleration.

When the reel 11 is being threaded prior to a winding operation, the load on reel motor 12 is very small. Consequently the excitation of control field winding 25c is greatly reduced. Bucking field 25d then predominates and causes armature excited machine 25 to decrease the field excitation of reel motor 12. This increases the speed of reel motor 12 at a time when it is desired to have motor 12 operate at slow speed.

In order to provide regulated slow threading speed operation of reel motor 12, armature excited machine 25 is provided with an additional field winding 25i on the control field axis. This field winding 25i is supplied from two tachometer generators 37 and 38 which are driven by reel motor 12 and mill motor 24. In some cases, in which it is desired to secure an exceedingly close speed match the field winding 25i could be a field winding on amplifying generator 35a. A speed relay 39, which is actually a voltage relay, serves to connect the field winding 25i to the tachometer generators 37 and 38 in dependence upon the speed of reel motor 12, and the connections are so made that the field winding 25i is energized in accordance with the difference of the voltages of the tachometer generators. A suitable rectifying device 40 is included in the connections to prevent reversal of the excitation of field winding 25i when the speed of reel motor 12 falls below the speed of the mill motor 24.

As shown in the drawing, the field windings 37a and 38a of the tachometer generators are energized from suitable constant voltage sources.

An instantaneous acting voltage relay 41 acts as a limit to prevent the field of the reel motor 12 being reduced below some predetermined safe value by the bucking field 25d of the armature excited machine 25 when there is no load on the reel motor 12. The contacts 41a of the voltage relay are connected in series with the field winding 25d and its operating coil is connected across the armature load brushes 25a. A suitable rectifying device 42 is connected in circuit with the coil of relay 41 to render the relay inactive when the armature voltage of machine 25 is in the direction to boost line voltage of excitation source 22, 23 and strengthen the field of reel motor 12.

With the foregoing understanding of the elements and their organization in the completed system, the operation of the system itself will readily be understood from the following detailed description.

It is assumed that switch 18 is closed and that the system is operating at one of its normal operating speeds with strip material being passed between rolls 13 which reduce its thickness and thereafter wound under a substantial tension on reel 11. It is further assumed that the armature excited dynamoelectric machine 25 is operating to buck the voltage of source 22, 23.

The control field winding 25c of armature reaction excited machine 25 is excited in accordance with the armature current of reel motor 12 and causes machine 25 to supply current to the field windings 20 and 21 of reel motor 12 and booster generator 19. As previously pointed out, constant armature current of reel motor 12 means constant tension of the strip 10 provided the lineal speed of the strip remains constant.

If the armature current of the reel motor should tend to increase, the excitation of control field winding 25c will increase. This will decrease the armature voltage of machine 25 and will thereby decrease its bucking effect and strengthen the field of the reel motor 12. Simultaneously, the reduced armature voltage of machine 25 will weaken the field of booster generator 19 and will thereby decrease its voltage. As a result the speed of the reel motor 12 is decreased and the current is reduced. During this time, the transformers 33 and 34 introduce components of excitation on the control field axis of machine 25 proportional to the rate of change of excitation and proportional to the rate of change of armature current respectively of reel motor 12. These components of excitation are so introduced as to oppose further change of the excitation of reel motor 12 and booster 19 and thereby anticipate the return of the armature current to normal, and very materially reduce any tendency of the system to hunt.

During the time that the strip is being wound on the reel, the armature current of reel motor 12 tends to increase as the diameter of the coil increases, and consequently the foregoing operation is proceeding almost continuously.

If the armature current had decreased instead of increased, the operation would have been similar but the reverse of that described in the foregoing.

When the voltage of source 14, 15 is reduced to provide slow speed threading operation of reel motor 12, voltage relay 39 closes its contacts and connects field winding 25₁ in circuit with tachometer generators 37, 38. Since there is no appreciable load on the reel motor 12, at this time, the field winding 25c is almost completely deenergized. As a result the buck field 25d predominates and would cause the machine 25 to weaken the field of reel motor 12 and to weaken the bucking effect of machine 19. This would cause the speed of the reel motor 12 to increase, which would be undesirable since the reel motor must operate at an even, slow speed while the mill is being threaded. At low threading speed the voltage of tachometer generator 37 predominates over the voltage of tachometer generator 38 and current is supplied to field winding 25₁ in such a direction as to cause machine 25 to strengthen the field of reel motor 12 and to strengthen the bucking effect of machine 19. The reel 11 then runs slightly faster than the mill. When the threading is completed and the strip is winding on the reel 11, the reel 11 runs slightly slower than the mill and the voltage of tachometer generator 37 decreases. As the voltage of tachometer generator 37 becomes equal to the voltage of tachometer generator 38, the excitation of field 25₁ becomes zero. The rectifier 40 prevents field 25₁ from reversing as the speed of reel motor 12 decreases further and the voltage of tachometer generator 38 exceeds the voltage of tachometer generator 37. The current field 25c then has complete control. At a predetermined speed of reel motor 12, i. e., at a predetermined value of voltage of source 14, 15, voltage relay 39 opens its contacts and disconnects field winding 25₁ from tachometer generators 37, 38.

If for any reason, the boost field winding 25c of machine 25 should become deenergized, the voltage relay 41 prevents the buck field 25d from weakening the field of reel motor 12 below some predetermined safe value. When the voltage of the machine 25 is in the buck direction and exceeds the safe value, the relay 41 opens the buck field 25d and thus rapidly reduces the voltage of machine 25. As a result the relay again closes its contacts and continues to vibrate gently and to hold the voltage accurately at a point determined by the setting of the relay.

In the modification of Fig. 2 the reel 44 is driven by a direct current electric motor 45 which is supplied from a variable voltage generator 46. The generator 46 may be driven by any suitable driving means such as an induction motor (not shown). Generator 46 is provided with a field winding 47 which is supplied from the armature load brushes of an armature reaction excited dynamoelectric machine 48 which is in all material respects identical with the armature reaction excited machine 25 of Fig. 1. Accordingly the various control fields, such as the fields 25d, 25g, 25h and 25₁, have been omitted for the purpose of simplifying the drawing. It will be understood, however, that one or more of these fields may be employed if desired.

The main control field 48a of machine 48 is connected to a bridge type of potentiometer 49 which in turn is connected to the supply source 50. One terminal of field winding 48a is connected to a midtap of one branch of the bridge potentiometer, and the other terminal of field winding 48a is connected to a movable contact 51 on the other branch. A voltage is applied to field winding 48a proportional to the amount of displacement of contact 51 from its central position. As the contact 51 passes through its central position, the sign of this voltage reverses.

Movable contact 51 is actuated in response to changes in the tension of the material 52 by means of a dancer roll 53 situated in a loop of the material. The movable contact 51 is connected to the dancer roll 53 through a suitable anti-hunting device 54 whose function is to prevent the movable contact 51 from moving in exact phase with the dancer roll. Since any of a number of suitable anti-hunting devices may be used, a description of the device 54 is omitted, although its construction is indicated in the drawing.

In operation, the dancer roll 53 occupies a predetermined position when the tension of the material has a predetermined desired value. If the tension increases or decreases from this value, the dancer roll moves to one side or the other of its predetermined position. This movement is transmitted through the anti-hunting device 54 to the movable contact 51. The movement of contact 51 on its arm of the rheostat varies the excitation of the control field 48a of the armature excited dynamoelectric machine 48.

If the tension of the material increases, the resulting movement of contact 51 will cause the armature excited machine to decrease the excitation of supply generator 46. The decreased excitation of generator 46 reduces the voltage supplied to the reel motor 45. As a result the speed of the motor and the tension of the material are reduced.

Similarly, if the tension of the material decreases, the movement of contact 51 causes armature excited machine 48 to increase the voltage supplied to the field winding of generator 47. This results in increasing the voltage of the generator which in turn results in increasing the speed of the reel motor and tension of the material.

Various features and details of operation of the armature reaction machine 48 are the same as already described in connection with Fig. 1.

Although in accordance with the provisions of the patent statutes, this invention is described as embodied in concrete form and the principle of the invention has been explained together with the best mode in which it is now contemplated applying that principle, it will be understood that the invention is not limited to the elements and connections illustrated, since alterations and modifications will readily suggest themselves to persons skilled in the art without departing from the true spirit of this invention or from the scope of the annexed claims.

What we claim as new and desire to secure by Letters Patent of the United States is:

1. A control system for a reel for a length of material comprising in combination, a dynamoelectric machine connected to the reel, a substantially constant voltage source for said machine, a booster generator connected between said source and said machine, and means for maintaining the tension of said material substantially constant comprising an armature excited dynamoelectric machine having a control field connected to be responsive to variations in the armature current of said reel machine for controlling the excitation of said booster generator to counteract said current variations.

2. A control system comprising in combination, a main dynamoelectric machine, means for maintaining the output of said machine substantially constant comprising an armature excited dynamoelectric machine having a pair of load brushes and electrical connections from said load brushes to said first machine, a control field winding connected to be excited in proportion to said output for producing a control flux along a first axis of the armature of said armature excited machine and a pair of short circuited armature brushes for producing an armature flux along a second axis at an angle with said first axis thereby to produce a voltage across said load brushes, and a series field winding connected in circuit with said load brushes for substantially completely neutralizing the armature flux produced by the load current of said armature excited machine, and means responsive to the rate of change of voltage of said main machine for modifying the excitation of said armature excited machine comprising a transformer having its primary winding connected to be energized by the voltage of said main machine and a generator having its field winding connected to the secondary winding of said transformer and having its armature connected to control the excitation of said armature excited machine.

3. A control system comprising in combination, a main dynamoelectric machine, means for maintaining an electrical operating characteristic of said machine substantially constant at a desired value comprising an armature reaction excited dynamoelectric machine having a pair of load brushes and electrical connections from said brushes to a field winding of said first machine, a control field winding connected to be excited in proportion to the magnitude of said characteristic for producing a control flux along a first axis of the armature of said armature excited machine and a pair of short circuited armature brushes for producing an armature flux along a second axis at an angle with said first axis thereby to produce a voltage across said load brushes, and a series field winding connected in circuit with said load brushes for substantially completely neutralizing the armature flux produced by the load current of said armature excited machine, and means responsive to the rate of change of voltage of said main machine for modifying the excitation of said armature excited machine so that said armature excited machine will hold a different value of said characteristic when said voltage is changing.

4. A control system comprising in combination, a main dynamoelectric machine, a variable source of voltage connected to said machine, means for maintaining the armature current of said machine substantially constant at a desired value comprising an armature excited dynamoelectric machine having a control field winding connected to be responsive to said armature current of said main machine, electrical connections from the armature of said armature excited machine to a circuit of said main machine for controlling an electrical characteristic thereof, and means responsive to rate of change of the voltage of said source for varying the excitation of said armature excited machine so that it holds a different value of current in the armature of said main machine when said main machine is changing speed.

5. A control system for a reel for a length of material comprising a dynamoelectric machine mechanically connected to the reel, means for feeding said material to said reel, a tension regulator for said material comprising an armature excited dynamoelectric machine having a control field winding connected to be energized in proportion to the armature current of said reel machine and having its armature connected to maintain the output of said reel machine substantially constant, and means for controlling the speed of said reel machine during threading operation comprising means for producing a control voltage proportional to the speed of said reel, and means for producing a second control voltage representative of the speed of the feeding of said material, said control voltage producing means being connected differentially to supply a component of excitation to said armature excited machine proportional to the difference of said control voltages.

6. A control system for a reel for a length of material, a dynamoelectric machine operatively associated with the reel, a regulating device for holding the tension of the material substantially constant at a desired value comprising an armature reaction excited dynamoelectric machine having a pair of load brushes and electrical connections from said brushes to a field winding of said first machine, a control field winding for producing a control flux along a first axis of the armature of said armature excited machine and means responsive to variation in the tension of the material for varying the excitation of said control field winding, and a pair of short circuited armature brushes for producing an armature flux along a second axis at an angle with said first axis thereby to produce a voltage across said load brushes and a series field winding connected in circuit with said load brushes for substantially completely neutralizing the armature flux produced by the load current of said armature excited machine, an adjustable voltage source connected to said reel dynamoelectric machine, and a transformer connected across said source and having its secondary winding connected to influence the excitation of said armature excited machine thereby to recalibrate said regulating device so that said regulating device will maintain the tension of said material substantially constant while the speed of said reel dynamoelectric machine is changing.

7. A control system for a reel for a length of material comprising in combination, an adjustable voltage direct current source, a main dynamoelectric machine mechanically connected to the reel, a regulator for maintaining the tension of the material substantially constant at a desired value comprising an armature excited dynamoelectric machine having a control field winding connected to be excited in response to the armature current of said reel dynamoelectric machine and having its armature connected to control an electrical characteristic of said reel dynamoelectric machine, a transformer having its primary winding connected to be energized by the voltage of said source, a generator having its field winding connected to the secondary winding of said transformer and having its armature connected to modify the excitation of said armature excited machine in accordance with the rate of change of voltage of said source thereby to recalibrate said regulator thereby to provide for maintaining the tension of the material approximately constant when the speed of said reel dynamoelectric machine is changing.

8. A control system for a reel for a length of material comprising in combination, a dynamoelectric machine for controlling the application of torque to the reel, and having a field winding supplied from a direct current source, a regulator for maintaining the tension of the material substantially constant comprising an armature excited dynamoelectric machine provided with a control winding energized from said source and a second control winding connected to be energized in response to the armature current of said reel dynamoelectric machine so that its magnetism opposes the magnetism of said first control winding, said armature excited machine having its armature connected with respect to said source so as to act as buck-boost exciter for said reel dynamoelectric machine.

9. A control system for a reel for a length of material comprising a dynamoelectric machine for controlling the application of torque to the reel and having a field winding connected to be energized from said source, a regulator for maintaining the tension of the material substantially constant at a desired value comprising an armature excited dynamoelectric machine having its armature connected to said source and to said field winding, said armature excited machine having a control field winding connected to said source to be energized so that its armature voltage bucks the voltage of said source and said armature excited machine having a second control winding energized in response to the armature current of said reel dynamoelectric machine so that its voltage tends to boost the voltage of said source, and means for limiting the armature voltage of said armature excited machine in one of said directions to a predetermined value.

10. A control system for a reel for a length of material comprising a dynamoelectric machine mechanically connected to the reel, means for producing a control voltage proportional to the speed of the reel, means for feeding said material to said reel, means for producing a control voltage proportional to the speed of said feeding, a regulator for the tension of said material comprising an armature excited dynamoelectric machine provided with a control field winding connected to be energized in response to the armature current of said reel machine and having its armature connected to the field winding of said reel dynamoelectric machine, said armature excited machine also being provided with an additional control field winding connected to be energized by the difference of said control voltages during threading operation.

11. A control system for a reel for winding a length of material being fed thereto comprising a dynamoelectric machine mechanically connected to the reel, an adjustable voltage source of supply for said machine, means for producing a control voltage proportional to the speed of said reel machine, means for producing a second control voltage representative of the speed of the feeding of said material, a regulator for the tension of said material comprising an armature excited dynamoelectric machine provided with a control field winding connected to be energized in proportion to the armature current of said reel machine and having its armature connected to the field winding of said reel dynamoelectric machine, said armature excited machine having a second control field winding connected to be energized by the difference of said control voltages during threading operation, and a rectifier in the connections between said second control field and said control voltage producing means whereby said second control field is deenergized when the control voltage proportional to the speed of said reel becomes less than the other control voltage.

MARTIN A. EDWARDS.
FRANCIS MOHLER.